Figure 8:
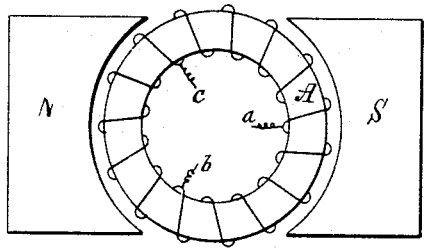

(No Model.) 2 Sheets—Sheet 1.
C. S. BRADLEY.
SYSTEM OF ELECTRICAL DISTRIBUTION.
No. 409,450. Patented Aug. 20, 1889.
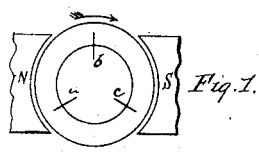
Fig. 1.
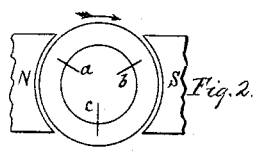
Fig. 2.
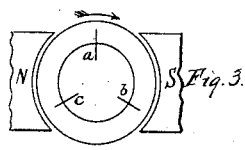
Fig. 3.
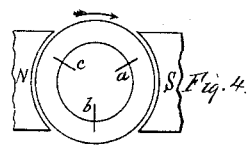
Fig. 4.
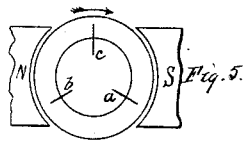
Fig. 5.
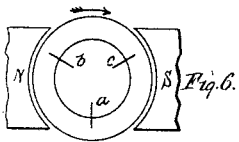
Fig. 6.
Fig. 7.
WITNESSES:
INVENTOR
Charles S. Bradley.
BY
McTighe & Worthington
ATTORNEYS (No Model.) 2 Sheets—Sheet 2.

C. S. BRADLEY.
SYSTEM OF ELECTRICAL DISTRIBUTION.

No. 409,450. Patented Aug. 20, 1889.

UNITED STATES PATENT OFFICE.

CHARLES S. BRADLEY, OF YONKERS, NEW YORK.

SYSTEM OF ELECTRICAL DISTRIBUTION.

SPECIFICATION forming part of Letters Patent No. 409,450, dated August 20, 1889.

Application filed October 20, 1888. Serial No. 288,681. (No model.)

*To all whom it may concern:*

Be it known that I, CHARLES S. BRADLEY, a citizen of the United States, residing at Yonkers, in the county of Westchester and State of New York, have invented certain new and useful Improvements in Systems of Electrical Distribution; and I do hereby declare the following to be a full, clear, and exact description of the invention, such as will enable others skilled in the art to which it appertains to make and use the same.

In the generation, distribution, and utilization of alternating currents it has been proposed to use two sets of coils on the generator, arranged angularly at ninety degrees, supplying two circuits with currents whose time-periods differed by one quarter-phase, and these two currents or sets of current were utilized to operate an electric motor having corresponding circuits symmetrically arranged, so that the alternation of the wavelengths or vibrations of current produced a rotation of the poles of the motor-armature, and the armature revolved in consequence. Such a system is clearly set forth in Letters Patent No. 390,439, issued to me October 2, 1888. I have therein shown a generator and a motor, both having the armature-circuit closed, and simply tapped at four points, ninety degrees apart, each two opposite points being connected into one external circuit and the other two opposite points being connected into the other external circuit. The external circuits obviously could be so arranged that one wire would serve as a common return for both. I have discovered, however, that the rotation of polarity in the motor can be accomplished without having as many as four coils, or two pairs of coils symmetrically arranged, and the object of my present invention is to reduce the elements to the smallest possible number with respect to both the generator and the motor.

The present invention consists in a dynamo-electric machine (whether generator or motor) having a closed armature-circuit tapped at three points, each of which is connected to one of three contact-rings, such armature revolving in inductive proximity to a field-magnet.

The invention further consists in a dynamo-electric machine constructed and adapted to generate or absorb three currents or waves of current all differing in their time-periods.

The invention further consists in a dynamo-electric machine constructed and adapted to generate or absorb three currents or waves of current, each one-third of a phase or wave-length behind its predecessor.

The invention further consists in the combination and arrangement of devices, all substantially as hereinafter fully described and claimed.

In alternating-current generators the number of field-magnet poles determines the number of vibrations per revolution, and for the sake of simplifying the description I will show the invention as applied to a two-pole machine, though of course it can be applied to other forms.

Figure 10:
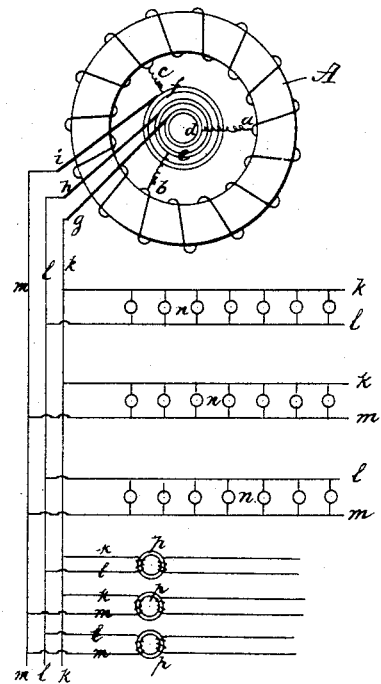
Figure 9:
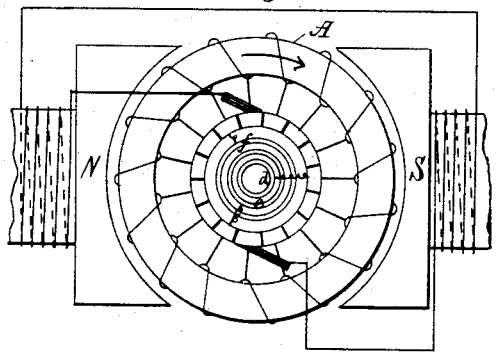
Figure 11:
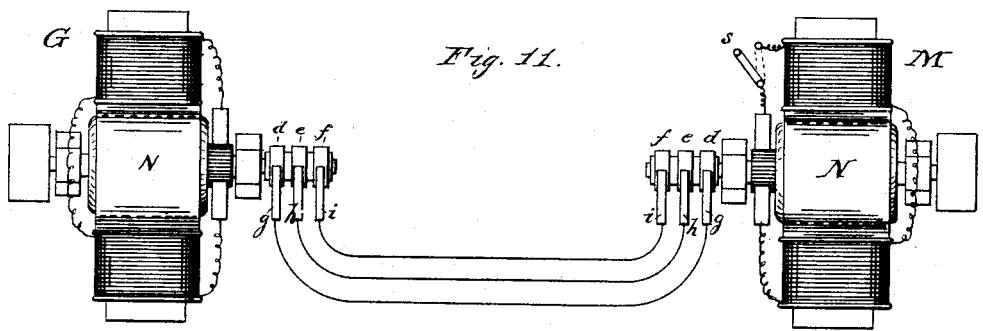

In the drawings which form part of this specification, Figures 1 to 6, inclusive, show diagrammatically the generator in six equal and successive portions of one revolution. Figs. 1ᵃ to 6ᵃ, inclusive, show the corresponding phases produced in the external circuits. Fig. 7 is a completed diagram of the phases occurring during the one revolution. Fig. 8 is a simple diagram representing my invention applied to a two-pole machine. Fig. 9 is a diagram showing the construction of the generator when intended for self-excitation. Fig. 10 is a diagram representing the manner of connecting a closed-circuit armature to give three series of alternating currents and three external circuits adapted to utilize them separately. Fig. 11 is a diagram showing a generator and motor, both self-excited, and the connecting-circuits.

Referring to Figs. 8, 9, and 10 it will be seen that I can use a simple ring-armature A with continuous winding closed on itself, the armature being placed for revolution in the field N S, which may be excited by the rectified current of the armature or a shunt thereof, or by a separate exciter, or by any of the usual or known methods. I select three equidistant points $a$, $b$, and $c$ of the armature-winding and connect them to the contact-rings $d\ e\ f$, which are shown as fitted against the end of the armature, but will in practice be on the shaft, as in Fig. 11. Separate brushes $g\ h\ i$ bear on the rings and, being three in number, are capable of forming three distinct pairs of circuits for external distribution with only three wires.

By reference to the operation disclosed in Figs. 1 to 6 and 1ª to 6ª, inclusive, and Fig. 10, the peculiar action of the generator will be understood. The diagrams, Figs. 1ª to 6ª, show the three partial phases produced during the sixth of a revolution of the armature which each diagram represents. If we now consider (see Fig. 10) each of the brushes *g h i* connected to one wire of a three-wire external circuit *k l m*, it will be seen that the latter may form three pairs *k l*, *k m*, and *l m*, and in each pair consumption or translating devices—for example, lamps *n*—may be connected. Upon now tracing the diagrams in connection with Fig. 10 it will be seen that each of the three external circuits will be a path for a distinct series of alternations. The three sections of the armature A will deliver, respectively, the alternations or waves of current indicated on the diagrams by *a b*, *a c*, and *b c*, and each set of waves will be complete and continuous, but will be behind one another in their time-periods to the extent of one-third of a phase or wave-length. If, then, the three external circuits be closed, each will receive a single set of alternations and serve for lighting and other distribution purposes and the current-strengths will depend upon the resistances in the circuit.

In my said former patent I have shown that an alternating-current generator with two pairs of collecting devices ninety degrees apart greatly increase the output capacity of a given machine owing to the quarter-phase difference between the alternations. In the present case, with only three collecting devices, the output capacity is still more increased by reason of the alternations differing by a third of a wave-length. Obviously, instead of the lamps *n* in Fig. 10, I can substitute the primary coils of converters *p* and place the lamps or other consumption devices in the secondary circuits of the converters, as indicated also in the same figure.

As in my patent, No. 390,439, it is evident that when two such machines are connected together, as shown in Fig. 11, whether their field-magnets be energized by rectified currents or otherwise, the first being power-driven, the second machine will operate as a motor in a manner, so far as rotation is concerned, similar to the rotation of the motor set forth in my said patent. I have shown the generator G and motor M as substantially alike, and each with a rectifying-commutator for delivering direct current to the field-magnets similarly to the plan illustrated by the diagram Fig. 9. The three connecting-circuits will in this case, as in Fig. 10, constitute three different circuits, and will be delivered into the motor-armature in such manner as to throw into the same in succession three separate series of current alternations, each of which will be substantially one-third of a wave-length behind the series preceding it, and will therefore determine the rotation of the armature, as described in my former patent.

I have discovered in electric motors operated upon the principle of two or more alternating currents differing in phase—such, for instance, as that shown in my said former patent or that shown in Fig. 9—that when the current is admitted to the armature of the motor it is difficult to start the latter when the field-magnet circuit is closed, whether the latter be supplied with its exciting-current from the mains or from an independent source; but, if at the moment of introduction of current into the armature-circuit the circuit of the field-magnet be left open, the armature will readily start into rotation and quickly rise in speed until it synchronizes with the generator, and the field-magnet circuit can then be closed and the operation of the armature will continue under its best conditions and remain at the speed of the generator.

In Fig. 11 I have shown the field-magnet of the motor as being excited by the currents from the main circuits rectified by a commutator, and in this field-magnet circuit I locate a switch *s* for the above purpose.

Obviously electro-motive devices similar to the motor shown in Fig. 11 may be inserted in the circuits *k l m* and the entire current can be rectified by means of the armature A and its commutator and brushes, from the latter of which the rectified and continuous current may be delivered to any desired translating or consumption device—such, for instance, as a continuous-current motor, an electroplating-bath, an arc lamp, or other device adapted to use with a continuous current. It is also obvious, as set forth in my above-mentioned patent, that continuous currents delivered to such an electro-motive device and passing in at the commutator-brushes can be split into three series of alternating currents of differing phase and delivered to the brushes *g h i*, which bear on the contact-rings *d e f*, and thence to the desired consumption devices.

By the foregoing invention I obtain the best possible results from an alternating-current machine with the least possible number of distributing or supply wires. This is due to the two features of closed armature-circuit and trisected winding. The latter determines the one-third phase difference in the series of alternations or waves, and the former permits three separate external circuits to be established on only three wires, while the potential of all three will be substantially alike. Were the armature-circuit made up of three separate coils, six wires would be required in the external circuits to accomplish the same results. Were the armature-circuit quadrisected, as in my previous patent, two separate circuits can be established with three wires, one being a common return for the other two; but only two independent currents can then be generated, each supplementing the other. It is true that with the quadrisected armature two currents are obtainable, each of which may be practically as great in strength as the machine would stand if produced in the ordinary way; but it is also true that with my present trisected armature three currents are obtainable, each of which may be practically as great in strength as the machine could generate with a four-coil or quadrisected armature, and this I accomplish with three separate external circuits composed altogether of but three wires. This I hold to be the maximum result with the fewest components of external circuit.

In the claims I use the term "current-leading device" as expressive of the means of connecting the machine to the external circuit, whether such means be rings and brushes or commutator and brushes, or both, or simple fixed connections. The last would obviously be sufficient in case I reversed the arrangement of the machine, making the armature stationary and the field-magnet movable.

I claim as my invention—

1. The combination, with an alternating-current dynamo-electric machine adapted to generate and deliver three separate series of alternations differing in their time-periods by one-third of a phase, of three external circuits composed in all of three conductors permutated into said three circuits, and consumption devices located in said external circuits.

2. In an electro-motive device, the combination of a field-magnet and a rotating armature provided with a current-rectifying commutator and brushes therefor, through which current is received into the armature and rotation produced in the moving part of the machine, three current-leading devices on the one hand connected, respectively, into the armature-circuit at equidistant points and so arranged relatively as to lead off three independent series of alternating currents substantially one-third of a phase apart in their relative time-periods, and on the other hand connected with three external circuits composed in all of three conductors permutated into the said three circuits, and consumption devices located in each of the three circuits.

In testimony whereof I affix my signature in presence of two witnesses.

CHARLES S. BRADLEY.

Witnesses:
T. J. McTIGHE,
V. GEIGER.